(12) United States Patent
Tsirkin

(10) Patent No.: US 9,405,642 B2
(45) Date of Patent: Aug. 2, 2016

(54) PROVIDING VIRTUAL MACHINE MIGRATION RELIABILITY USING AN INTERMEDIARY STORAGE DEVICE

(71) Applicant: Red Hat Israel, Ltd., Raanana (IL)

(72) Inventor: Michael Tsirkin, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 214 days.

(21) Appl. No.: 13/753,285

(22) Filed: Jan. 29, 2013

(65) Prior Publication Data

US 2014/0215172 A1  Jul. 31, 2014

(51) Int. Cl.
*G06F 11/20* (2006.01)
*G06F 9/455* (2006.01)

(52) U.S. Cl.
CPC .......... *G06F 11/2046* (2013.01); *G06F 11/203* (2013.01); *G06F 11/2028* (2013.01); *G06F 2009/45583* (2013.01); *G06F 2201/815* (2013.01); *G06F 2212/152* (2013.01)

(58) Field of Classification Search
CPC .............. G06F 2209/4557; G06F 2209/45583; G06F 11/1402; G06F 2212/152
See application file for complete search history.

(56) References Cited

U.S. PATENT DOCUMENTS

| | | | |
|---|---|---|---|
| 7,868,897 B2 | 1/2011 | Vembu et al. | |
| 2008/0270564 A1* | 10/2008 | Rangegowda et al. | 709/212 |
| 2011/0197039 A1* | 8/2011 | Green et al. | 711/162 |
| 2011/0264788 A1 | 10/2011 | Costa | |
| 2011/0302577 A1 | 12/2011 | Reuther et al. | |
| 2011/0320556 A1* | 12/2011 | Reuther | 709/213 |
| 2012/0017031 A1* | 1/2012 | Mashtizadeh et al. | 711/6 |
| 2013/0014103 A1* | 1/2013 | Reuther | G06F 3/0647 718/1 |
| 2013/0117744 A1 | 5/2013 | Klein et al. | |
| 2014/0025890 A1 | 1/2014 | Bert et al. | |
| 2014/0059539 A1* | 2/2014 | Simonsen et al. | 718/1 |
| 2014/0215459 A1 | 7/2014 | Tsirkin | |

OTHER PUBLICATIONS

Lin, C. "Virtual Memory," http://www.cs.umd.edu/, 4 pages, 2003.
Feiner, P. "Exogenous Memory Management via -Mem-Path," Downloaded from http://lists.gnu.orgiarchive/html/qemu-dvel/2012-11/msg02024.html, 4 pages, Nov. 20, 2012.
U.S. Appl. No. 13/753,156, NonFinal Office Action mailed Apr. 22, 2015.
U.S. Appl. No. 13/753,156, Final Office Action mailed Sep. 4, 2015.
U.S. Appl. No. 13/753,156, Non-Final Office Action mailed Dec. 3, 2015, 16 pages.

* cited by examiner

*Primary Examiner* — Hal Schnee
(74) *Attorney, Agent, or Firm* — Lowenstein Sandler LLP

(57) ABSTRACT

Systems and methods for live migration of a virtual machine are provided. A migration manager can send a request to a source host machine to migrate a virtual machine to a first destination host machine. The migration manager can determine that the migration of the virtual machine from the source host machine to the first destination host machine has failed. The migration manager can identify an intermediary storage device used during the migration to store a state of the virtual machine. The migration manager identifies a second destination host machine for the virtual machine migration. The migration manager causes the second destination host machine to obtain the state of the virtual machine from the intermediary storage device to migrate the virtual machine to the second destination host machine.

17 Claims, 5 Drawing Sheets

PROVIDING VIRTUAL MACHINE MIGRATION RELIABILITY USING AN INTERMEDIARY STORAGE DEVICE

TECHNICAL FIELD

Embodiments of the present disclosure relate to a computer system, and more specifically, to a method for providing virtual machine migration reliability using an intermediary storage device.

BACKGROUND

A virtual machine (VM) is a portion of software that, when executed on appropriate hardware, creates an environment allowing the virtualization of a physical computer system. Virtualization permits multiplexing of an underlying host computer between different VMs. The host computer typically allocates a certain amount of its resources to each of the VMs. Each VM then can use the allocated resources to execute applications, including operating systems (referred to as guest operating systems (OS)). The software layer providing the virtualization is commonly referred to as a hypervisor and is also known as a virtual machine monitor (VMM), a kernel-based hypervisor, or a host operating system. The hypervisor usually emulates the underlying hardware of the host computer, making the use of the VM transparent to the guest operating system and the user of the computer. A VM may have a virtual processor, virtual system memory, virtual storage, and various virtual devices. Virtual machines may be migrated between a source host computing platform ("the source host") and a destination host computing platform ("the destination host") connected over a network, which may be a local-area network or a wide area-network that may include the Internet.

One method of migrating a virtual machine from a source host to a destination host over a network is to permit a running source VM to continue to run during the migration process, a technique known as live migration. Live migration typically permits a running VM to be moved between different physical machines without disconnecting a running client or application program. For a successful live migration, memory, storage, and network connectivity of the VM should be migrated from the source host to the destination host. While the VM on the source host is running, its memory can be copied to the destination host. Memory on the source VM can change during the memory copy process. If the memory of the source VM changes, the changed memory can be copied to the destination host. When a rate of change of the memory is below a threshold, the VM on the source can be suspended and the state of the VM, including memory, storage, and network connectivity, can be copied to the destination host.

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Figure 1:
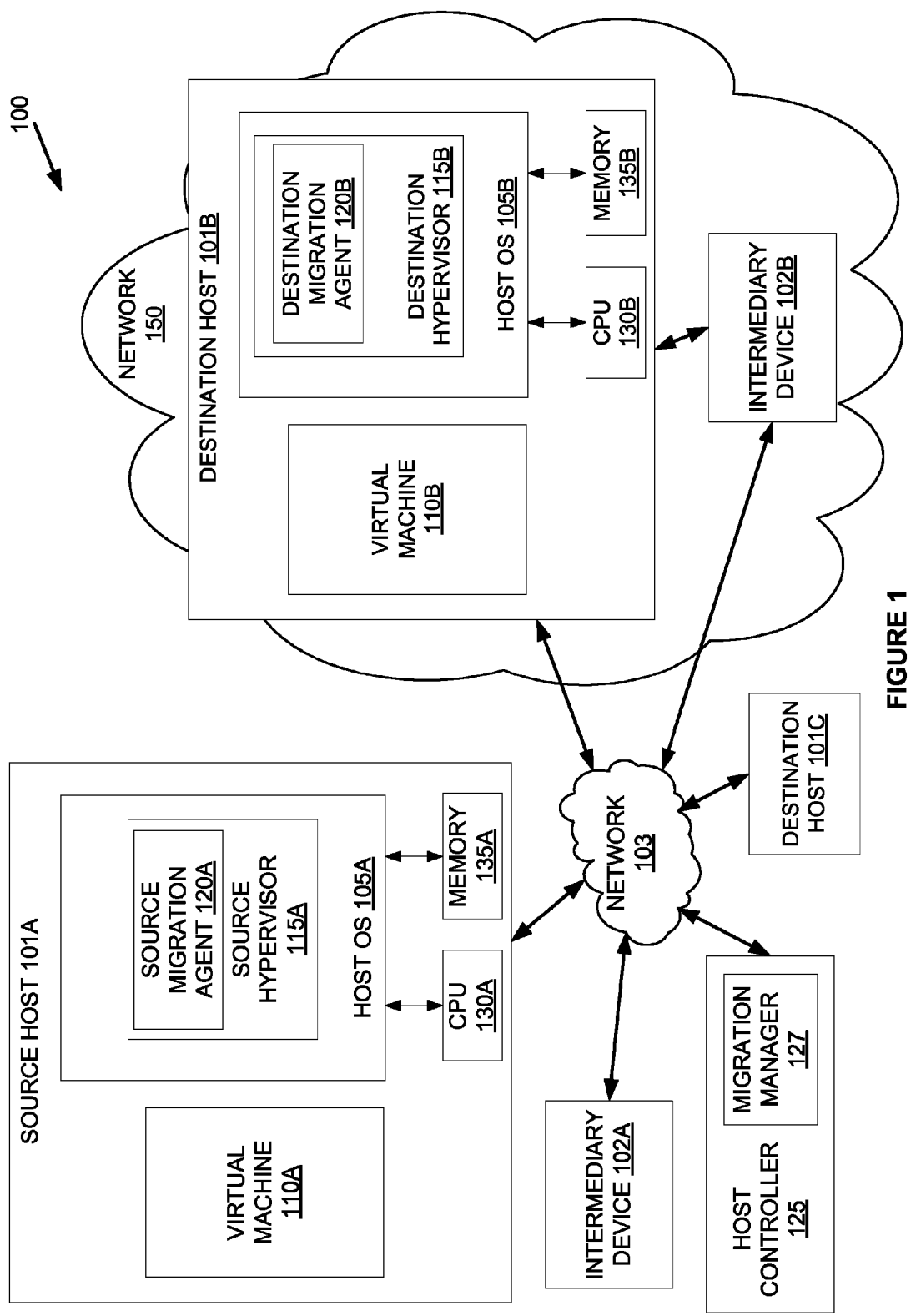
FIG. 1 is a block diagram that illustrates an example system architecture in which embodiments of the present disclosure may be implemented.

Performing live migration of virtual machines between hosts generally includes a pre-copy memory migration stage having a warm-up phase and a stop-and-copy-phase followed by a post-copy memory migration stage. The migration process can fail at any of the above stages if, for example, a destination host or the network between the source host and the destination host encounters a problem. A failure after the source machine is suspended and has started to copy or transmit its memory state to the destination host can cause significant downtime because after a failure, the copy process is restarted. Downtime after a failure during live migration may be lengthy—especially for migration between geographically remote hosts—and is approximately proportional to the size of memory and applications running on the source virtual machine. While the VM is in a suspended state, attempts to access the VM can result in page-faults or network-faults, which can also result in loss or degradation of data. Techniques of the present disclosure address the above problems by utilizing an intermediary device. In particular, in the warm-up phase, a hypervisor copies all of the memory pages associated with the VM on the source host to the destination host while the VM is still running on the source host. Before or during the warm-up phase, the hypervisor can copy or synchronize memory pages associated with the VM to an intermediary device. If some memory pages change during the memory copy process, known as dirty pages, the dirty pages may be re-copied to the destination host and to the intermediary device until the rate of re-copied pages is more than or equal to the page dirtying rate. Once the copying is complete, the live migration process can enter the stop-and-copy phase.

During the stop-and-copy phase, the VM is stopped, and the remaining dirty pages are copied to the destination host. In one implementation, the remaining dirty pages can also be copied to the intermediary device.

Next, in the post-copy memory migration stage, the VM is suspended at the source host. When the VM is suspended, a minimal execution state of the source VM (CPU, registers, non-pageable memory) is transferred to the destination host. The minimal execution state of the VM can be transferred to the destination host via the intermediary device. The VM is then resumed at the destination host.

If a failure occurs during any migration stage or phase (e.g., pre-copy stage, warm-up phase, the stop-and-copy phase, post-copy stage) at the destination host or on the network between the source host and the destination host, instead of restarting, the VM memory can be obtained from the intermediary device. For a network failure, the destination host can obtain the VM memory from the intermediary device. For a destination host failure, another destination host can be used, which can obtain the VM memory from the intermediary device.

Techniques of the present disclosure that employ an intermediary device may provide a high availability solution to live migration that can reduce downtime and can be substantially faster than previous live migration methods.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

FIG. 1 illustrates sample virtualization architecture 100 in which embodiments may operate. The virtualization architecture 100 may include a source host computer system 101a (the "source host 101a"), one or more intermediary devices 102a, 102b, a first destination host computer system 101b (the "destination host 101b") and a second destination host computer system 101c (the "destination host 101c"), each connected to a network 103. The network 103 may be a private network (e.g., a local area network (LAN), a wide area network (WAN), intranet, etc.) or a public network (e.g., the Internet).

The source host 101a and destination host 101b, 101c may be a server, a workstation, a personal computer (PC), a mobile phone, a smart phone, a mobile computing device, a personal digital assistant (PDA), tablet, laptop computer, thin client, etc. The source host 101a and the destination hosts 101b, 101c can include hardware components such as one or more physical central processing units (CPUs) 130a-130b, memory 135a-135b, and other hardware components.

A source host 101a can include one or more virtual machines (including a virtual machine 110a to be migrated) and can run an operating system 105 ("host OS") to manage its resources. Each virtual machine can run a guest operating system. In one embodiment, the source host 101a runs a source hypervisor 115a to virtualize access to the underlying source host hardware, making the use of virtual machine 110a transparent to the guest OS running on virtual machine 110a and users (e.g., a system administrator) of the source host 101a.

A destination host 101b can include one or more virtual machines 110b and can run an operating system 105 ("host OS") to manage its resources. Each virtual machine can run a guest operating system. In one embodiment, the destination host 101b runs a destination hypervisor 115b to virtualize access to the underlying destination host hardware, making the use of virtual machine(s) 110b transparent to the guest OS running on virtual machine 110b and users (e.g., a system administrator) of the source host 101b.

Initially, as shown in FIG. 1, the virtual machine 110a is managed by the source hypervisor 115a. In one embodiment, a process is provided for migrating the virtual machine 110a from the source host 101a running the source hypervisor 115a to the destination host 101b running the destination hypervisor 115b using at least one intermediary device 102.

Intermediary device 102 can be accessible by the source host 101a and by the destination hosts 101b, 101c. The intermediary device 102 can be part of networked storage (e.g., network attached storage (NAS), storage area network (SAN). Alternatively, the intermediary device 102 can be part of a server, a workstation, a personal computer (PC), a mobile phone, a smart phone, a mobile computing device, a personal digital assistant (PDA), tablet, laptop computer, thin client, etc. The intermediary device 102 can include hardware components such as one or more physical central processing units (CPUs), memory, and other hardware components. The intermediary device 102 can be located with the source host, within the same network as the source host, with the destination host, within the same network 150 as the destination host, or at any other location. The intermediary device 102 can be configured to perform the actions described in detail below with regard to FIG. 4.

In one embodiment, the source hypervisor 115a may include a source migration agent 120a and the destination hypervisor 115b may include a corresponding destination migration agent 120b. The migration agent 120a, 120b can receive migration instructions from a host controller 125. Migration agent 120a, 120b can also make migration decisions. Although shown as discrete components of the hypervisors 115a-115b, the migration agents 120a-120b may be separate components coupled to hypervisors 115a-115b.

The host controller 125 may reside on a designated computer system (e.g., a server computer, a desktop computer, etc.) or be part of the host machines 101a, 101b, 101c or another machine. Host controller 125 may include a migration manager 127 that can manage virtual machine migration by issuing instructions to migration agents 120a and 120b on hypervisors 115a, 115b. The migration manager 127 on host controller 125 and migration agents 120a, 120b can work together to manage migrations, including determining a destination host machine 101b, 101c, identifying and coordinating one or more intermediary devices 102, initiating and scheduling migration, detecting and managing migration failures, etc.

To initiate a migration, the migration agent 120a of the source hypervisor 115a can receive a request from the migration manager 127 of the host controller 125 to migrate virtual machine 110a from the source host 101a to the destination host 101b. The host controller 125 can issue the request after a triggering event (e.g., a system administrator's migration request, system conditions, such as resource utilization by source host exceeding a threshold). Source migration agent 120a can begin the pre-copy warm-up phase on source host machine 101a by directing memory of the virtual machine 110a to be copied to the destination host machine 101b. Source migration agent 120a can also direct memory to be copied to or synchronized with the intermediary device 102 either before or during the warm-up phase. The host controller 125 can instruct the source host 101a to copy its memory to the intermediary device 102. The intermediary device 102 can also take a more active role and can request that the source host 101a copy its memory to the intermediary device 102. The intermediary device 102 can transparently copy the memory by obtaining transmissions from the source host 101a to the destination host 101b. The warm-up phase is complete when a significant portion of memory is copied to the destination host 101b and to the intermediary device 102.

Once the warm-up phase is complete, source migration agent 120a can initiate the stop-and-copy-phase by stopping the virtual machine and copying any dirty memory pages to the destination host 101b. Dirty memory pages refer to memory pages that were changed by the virtual machine 110a after the initial copying of the memory of the virtual machine 110a to the destination host 101b and the intermediary device 102. Source migration agent 120a can also issue a command to copy or synchronize any dirty pages to the intermediary device 102. Migration manager 127 can receive a notification when the stop-and-copy-phase is successful and can inform the source migration agent 120a to begin the post-copy memory migration stage.

In the post-copy memory migration stage, the source migration agent 120a can issue a command to suspend the virtual machine 110a at the source host 101a. When the virtual machine 110a is suspended, the source migration agent 120a can transmit a minimal execution state of the source virtual machine 110a (e.g., CPU, registers, a state of devices accessible to virtual machine 110a, non-pageable memory) to the destination host 101b. The minimal execution state of the source virtual machine can be transferred directly to the destination host 101b or can be transferred via one or more intermediary device 102. The minimal execution state of the source virtual machine 110a transmitted directly to the destination host 101b can include any part of the virtual machine state that host controller 125 does not cause to be stored at the intermediary device 102 (e.g., the minimal execution state, a remaining state that does not include memory). Hence, the intermediary device 102 can store the memory of virtual machine 110a and optionally the minimal execution state of the virtual machine 110a.

If host controller 125 detects a migration failure at any phase of migration, it can determine the cause of the failure (e.g., network-based, destination host-based). If the cause of failure is the network (e.g., the network between the source host 101a and the destination host 101b is down), the destination host 101b can obtain the state of the virtual machine 110a (or any missing portion of the state) from the intermediary device 102a. If the cause of failure is the destination host 101b (e.g., abnormal operation of the destination host 101b), host controller 125 can identify a second destination host 101c and initiate migration to second destination host 101c. Second destination host 101c can include the same or similar components, hardware, software and features as first destination host 101b, including destination hypervisor 115, destination migration agent 120, CPU 130, memory 135, etc. The second destination host 101c can obtain the state of virtual machine stored by the intermediary device 102. If the entire state of the virtual machine 110a is on the intermediary device 102, the second destination host 101c can obtain it from the intermediary device 102. When the intermediary device 102 only has the memory of the virtual machine 110a, for example, the second destination host 101c can obtain other elements of the state from the source host 101a, including the minimal execution state of the virtual machine 110a.

To minimize downtime during live-migration, host controller 125 can oversee and direct the live-migration processing by issuing migration instructions to the migration agents 120 on hosts 101a, 101b and 101c, and to intermediary device 102. Example migration instructions to the migration agents 120 include instructions to destination migration agent 120b that identify the intermediary device 102 as having a state of the virtual machine 110a. The instructions to a migration agent on second destination host 101c can include instructions to retrieve the state of the virtual machine 110a from the intermediary device 102. Example migration instructions to intermediary device 102 can include an instruction to transmit the state of the virtual machine 110a to the destination host machine 101c.

In alternative implementation, iintermediary device 102 can have a more active role in the migration process. For example, intermediary device 102 can receive an error message that indicates a migration failure. In response to the error message, intermediary device 102 can determine a second destination host machine 101c and transmit the state of the virtual machine 110a to the second destination host machine 101c. Yet alternatively, migration agents 120 can have a more active role in the migration process. For example, migration agents 120 can issue or relay migration instructions to intermediary device 102.

The "source" and "destination" designations for the, hosts, hypervisors and migration agents are provided for reference purposes in illustrating an exemplary implementation of the migration process according to embodiments. It will be further appreciated that depending on the particulars of a given migration event, a hypervisor may at one time serve as the source hypervisor, while at another time the hypervisor may serve as the destination hypervisor.

Figure 2:
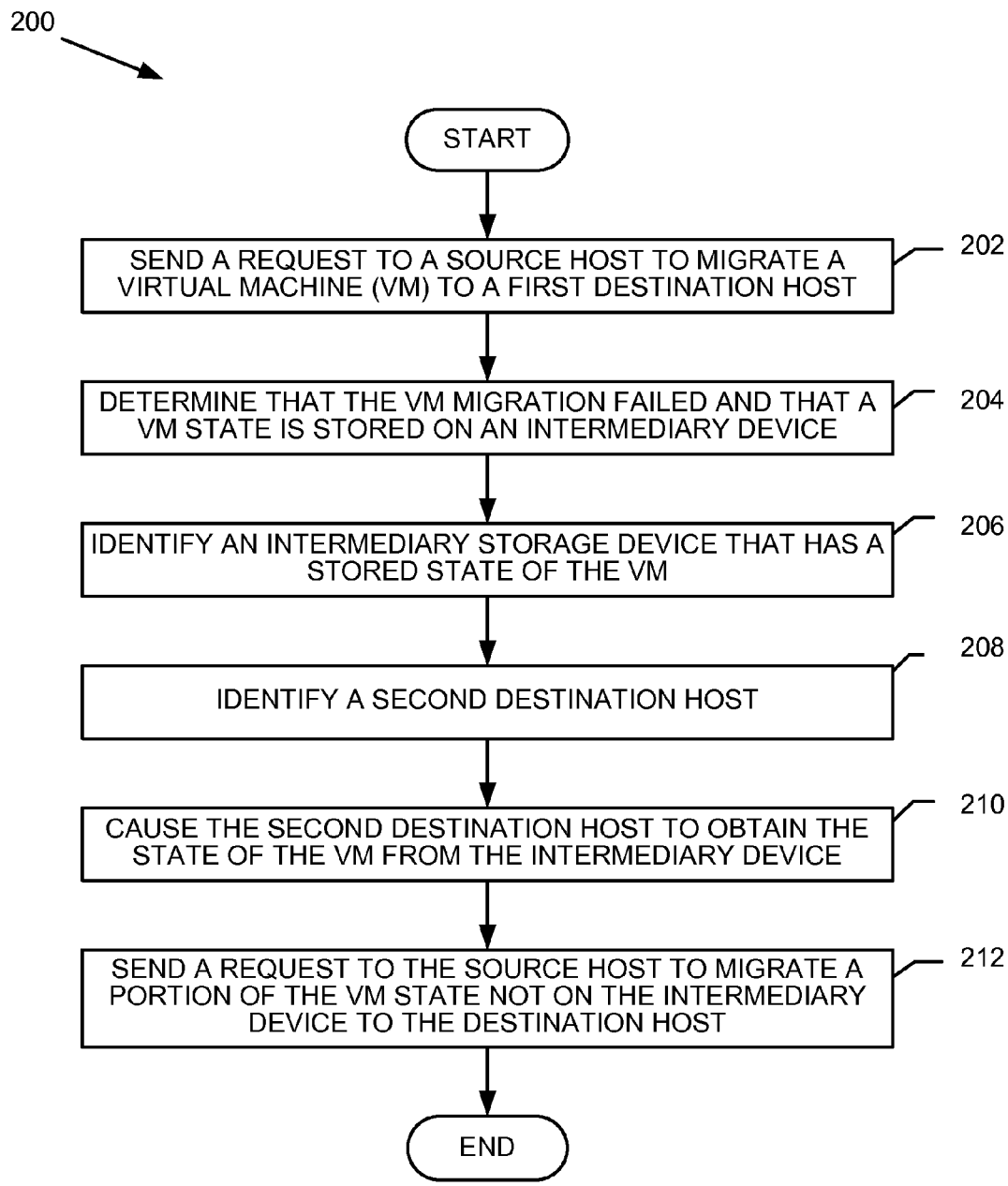
FIG. 2 is a flow diagram illustrating one embodiment of a method for live migration of a virtual machine from a source host to a destination host using an intermediary device.

FIG. 2 is a flow diagram illustrating of one embodiment of a method 200 for live migration of a virtual machine from a source host to a destination host using an intermediary device. Although the method 200 is described in terms of live migration of a virtual machine (e.g., 110) residing on the source host 101a to a destination host (e.g., 101b, 101c) using an intermediary device (e.g., 102), the method 200 of FIG. 2 may be applied to migration of a virtual machine between any two hosts (101a-101n) over the network 103 or residing on the same host machine (e.g., source host 101a). Method 200 may be performed by processing logic (e.g., in computer system 500 of FIG. 5) that may comprise hardware (e.g., circuitry, dedicated logic, programmable logic, microcode, etc.), software (such as instructions run on a processing device), firmware, or a combination thereof. In one embodiment, method 200 is performed primarily by the migration manager 127 on host controller 125 of FIG. 1.

Referring to FIG. 2, in one embodiment, method 200 begins when, at block 202, a migration manager can send a request to a source host machine to migrate a virtual machine to a first destination host machine. The host controller can issue the request after a triggering event (e.g., a system administrator's migration request, system conditions, such as resource utilization by source host above a threshold). At block 204, the migration manager can detect that the migration of the virtual machine from the source host machine to the first destination host machine has failed. The migration manager can detect that the failure was caused by the network or by the first destination host machine, as described herein.

At block 206, the migration manager can identify an intermediary storage device that has a stored state of the virtual machine. The stored state can include the memory of the virtual machine. For failures with the first destination host machine, the migration manager can identify a second destination host at block 208. For network-based failures, the migration manager can identify a second destination host at block 208, or can issue instructions to retry migration to the first destination host machine (not shown).

In implementations utilizing a second destination host, at block 210 the migration manager can cause the second destination host machine to obtain the state of the virtual machine from the intermediary storage device to migrate the virtual machine to the second destination host machine. The migration manager can instruct the second destination host machine to retrieve the state of the virtual machine from the intermediary device. Alternatively, the migration manager can instruct the intermediary device to transmit the state of the virtual machine to the second destination host machine.

Next, at block 212 the migration manager can send a request to the source host machine to migrate a remaining state of the virtual machine to the second destination host machine. The remaining state can include: CPU, registers, a state of devices accessible to virtual machine 110, non-pageable memory, etc. The second destination host machine can then start executing the virtual machine using the received memory of the vrtual machine and received remaining state of the virtual machine 110a, thus completing the live migration of the virtual machine.

In alternative implementations in which the migration manager issues instructions to retry migration to the first destination host machine, the migration manager can instruct the first destination host to remove any previously-received memory or state of the virtual machine 110a, and to obtain the memory from the intermediary device 102. The migration manager can then send a request to the source host machine to migrate the remaining state of the virtual machine (if it is not stored on the intermediary device) to the first destination host machine.

Figure 3:
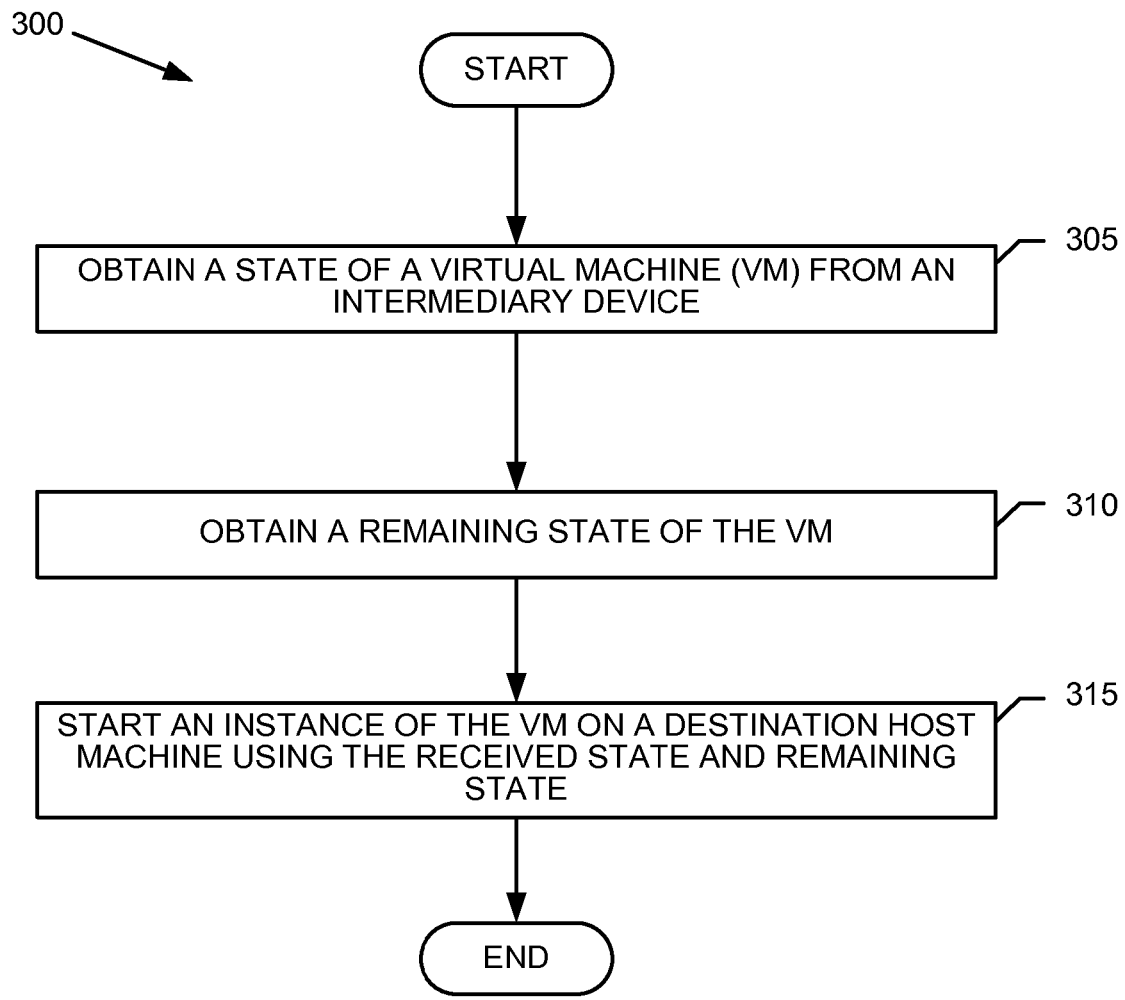
FIG. 3 is a flow diagram illustrating another embodiment of a method for live migration of a virtual machine from a source host to a destination host using an intermediary device.

FIG. 3 is a flow diagram illustrating of an embodiment of obtaining a state of a virtual machine. Although the method 300 is described in terms of live migration of a virtual machine (e.g., 110) residing on the source host 101a to a destination host (e.g., 101b, 101c) using an intermediary device (e.g., 102), the method 300 of FIG. 3 may be applied to migration of a virtual machine between any two hosts (101a-101n) over the network 103 or residing on the same host machine (e.g., source host 101a). Method 300 may be performed by processing logic (e.g., in computer system 500 of FIG. 5) that may comprise hardware (e.g., circuitry, dedicated logic, programmable logic, microcode, etc.), software (such as instructions run on a processing device), firmware, or a combination thereof. In one embodiment, method 300 is performed primarily by the destination hypervisor (e.g., 115b, 115c) residing on a destination host (e.g., 101b, 101c) of FIG. 1.

Referring to FIG. 3, in one embodiment, method 300 begins when, at block 305, the hypervisor at the destination host machine can obtain a state of a virtual machine from an intermediary device. The state of the virtual machine can include memory of the virtual machine. At block 310, the hypervisor can obtain a remaining state of the virtual machine, as described herein. At block 315, the hypervisor can start the execution of the virtual machine on the destination host using the received state of the virtual machine and the remaining state of the virtual machine.

Figure 4:
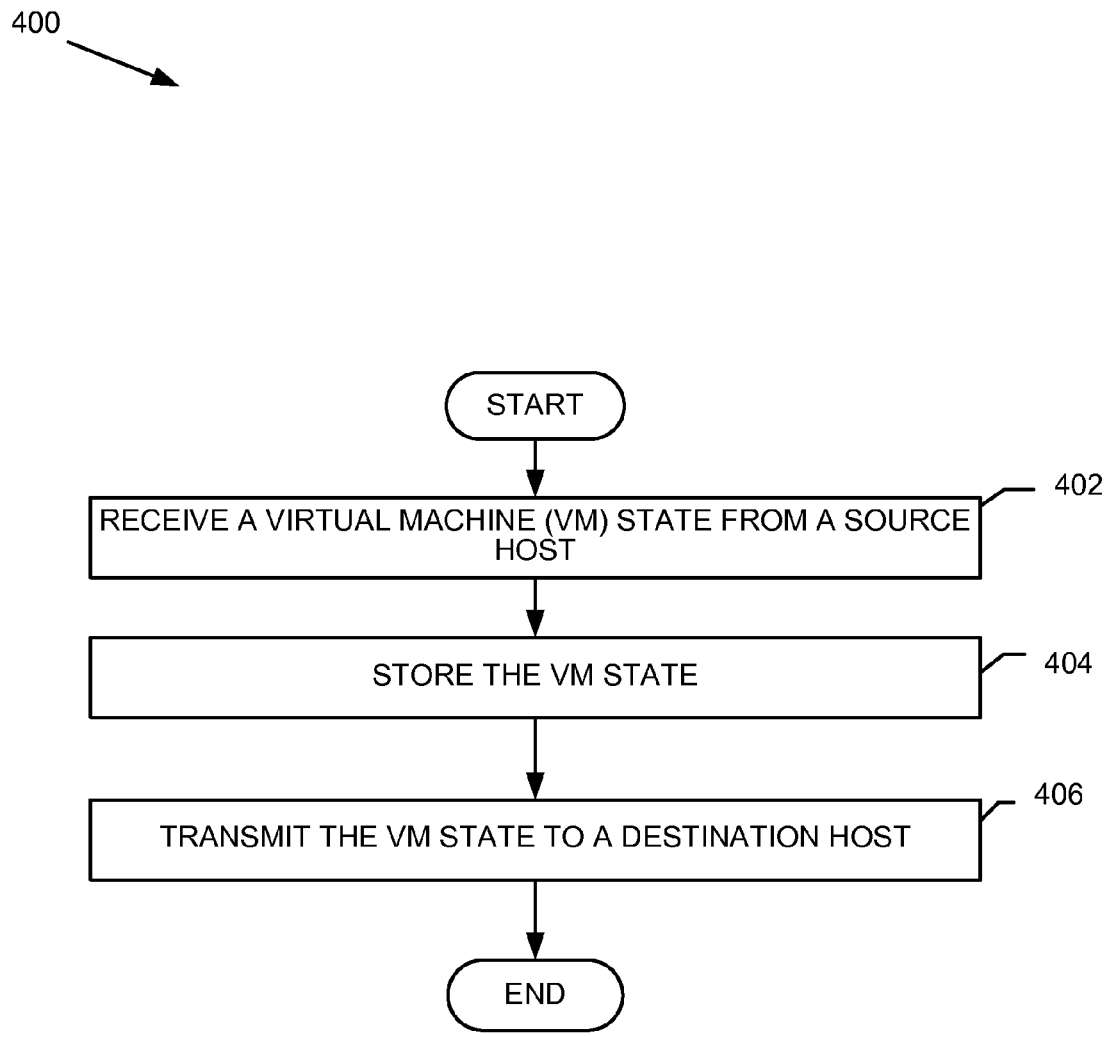
FIG. 4 is a flow diagram illustrating a further embodiment of a method for live migration of a virtual machine from a source host to a destination host using an intermediary device.

FIG. 4 is a flow diagram illustrating of an embodiment of virtual machine migration using an intermediary device. Although the method 400 is described in terms of live migration of a virtual machine (e.g., 110) residing on the source host 101a to a destination host (e.g., 101b, 101c) using an intermediary device (e.g., 102), the method 400 of FIG. 4 may be applied to migration of a virtual machine between any two hosts (101a-101n) over the network 103 or residing on the same host machine (e.g., source host 101a). Method 400 may be performed by processing logic (e.g., in computer system 500 of FIG. 5) that may comprise hardware (e.g., circuitry, dedicated logic, programmable logic, microcode, etc.), software (such as instructions run on a processing device), firmware, or a combination thereof. In one embodiment, method 400 is performed primarily by intermediary device 102 of FIG. 1.

Referring to FIG. 4, in one embodiment, method 400 begins when, at block 402, the intermediary device receives a state of a virtual machine from a source host machine. The state of the virtual machine can include memory of the virtual machine. In one implementation, the intermediary device can store or cache the state of the virtual machine at block 404. In another implementation, the intermediary device can relay the state of the virtual machine without storing it. At block 406, intermediary device can transmit the state of the virtual machine to a destination host machine in response to an instruction from a host controller, a message from a hypervisor, or from an error message (e.g., a migration failure message).

Figure 5:
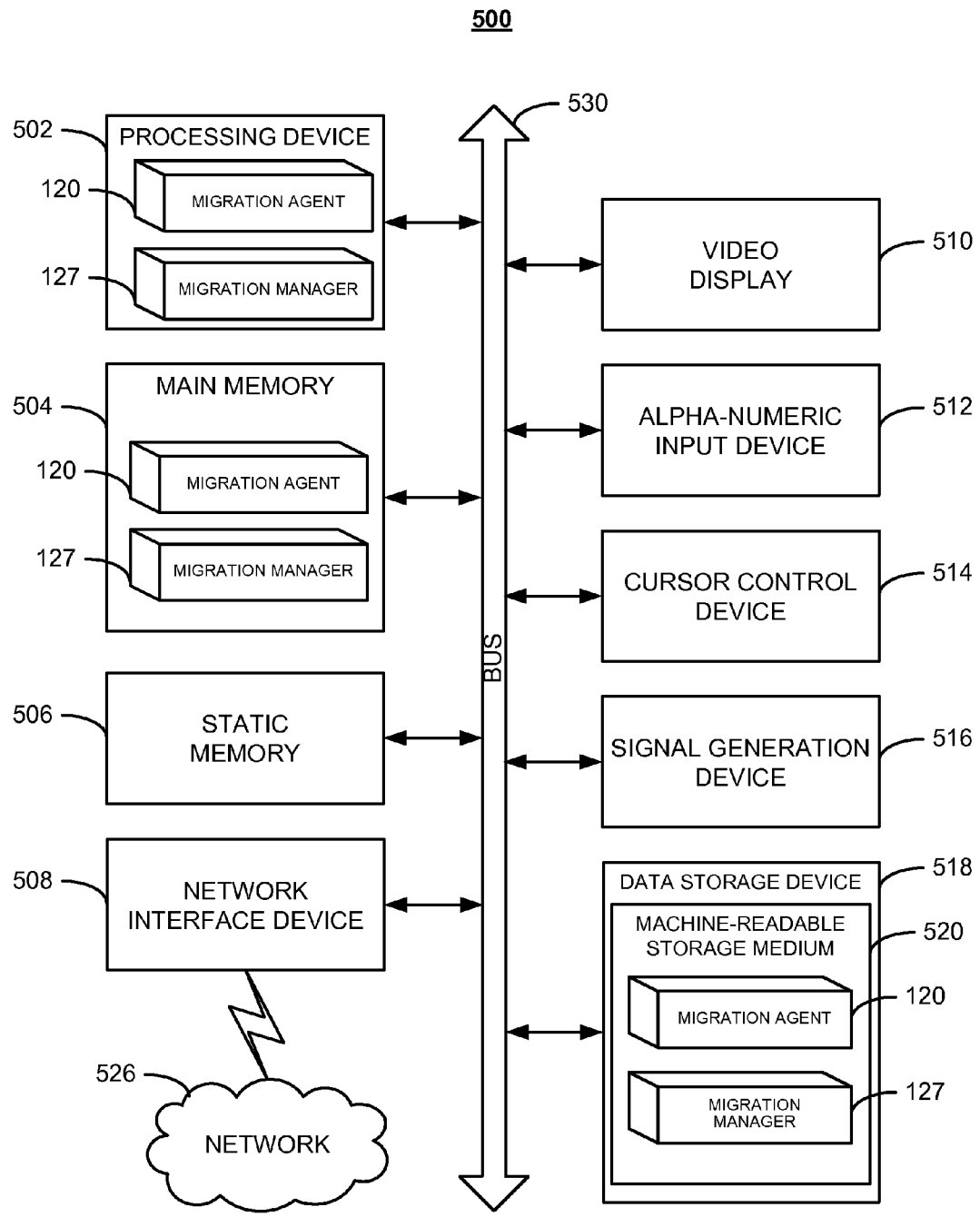
FIG. 5 illustrates a diagrammatic representation of a machine in an example form of a computer system within which a set of instructions, for causing the machine to perform any one or more of the methodologies discussed herein, may be executed.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) (such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 can be configured to execute the migration manager 127 and the migration agent 120 for performing the operations and steps discussed herein.

Computer system 500 may further include a network interface device 508. Computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

Data storage device 518 may include a machine-readable storage medium (or more specifically a computer-readable storage medium) 520 having one or more sets of instructions (e.g., migration manager 127, migration agent 120) embodying any one or more of the methodologies of functions described herein. The migration manager 127 and the migration agent 120 may also reside, completely or at least partially, within main memory 504 and/or within processing device 502 during execution thereof by computer system 500; main memory 504 and processing device 502 also constituting machine-readable storage media. The migration manager 127 and the migration agent 120 may further be transmitted or received over a network 526 via network interface device 508.

Machine-readable storage medium 520 may also be used to store the device queue manager logic persistently. While machine-readable storage medium 520 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present disclosure. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "causing", "instructing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above.

In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:
    sending, by a migration manager executed by a processing device, a request to a source host machine to migrate a virtual machine to a first destination host machine, wherein the migration is to store data associated with the virtual machine on a plurality of intermediary storage devices;
    determining that the migration of the virtual machine from the source host machine to the first destination host machine has failed after the virtual machine is suspended;
    in response to the determination that the migration failed:
        identifying one or more intermediary storage devices of the plurality of intermediary storage devices used during the migration to store a state of the virtual machine;
        identifying a second destination host machine for the virtual machine migration; and
        causing the second destination host machine to obtain the stored state of the virtual machine from the one or more identified intermediary storage devices before the virtual machine is resumed at the second destination host machine.

2. The method of claim 1 wherein causing the second destination host machine to obtain the state of the virtual machine comprises:
    instructing the second destination host machine to retrieve the state of the virtual machine from the one or more identified intermediary storage devices.

3. The method of claim 1, wherein the state of the virtual machine on the one or more intermediary storage devices is at least a portion of memory of the virtual machine at the source host machine.

4. The method of claim 3 wherein causing the second destination host machine to obtain the state of the virtual machine further comprises:
    sending, by the migration manager, a request to the source host machine to migrate a remaining state of the virtual machine to the destination host machine.

5. The method of claim 1, wherein the plurality of intermediary storage devices and the source host machine are part of the same network.

6. The method of claim 1, wherein the plurality of intermediary storage device devices and the destination host machine are part of the same network.

7. A system, comprising:
    a memory; and a processing device, operatively coupled with the memory, to:
- send a request to a source host machine to migrate a virtual machine to a first destination host machine, wherein the migration is to store data associated with the virtual machine on a plurality of intermediary storage devices;
- determine that the migration of the virtual machine from the source host machine to the first destination host machine has failed after the virtual machine is suspended;
- in response to the determination that the migration failed:
  - identify one or more intermediary storage devices of the plurality of intermediary storage devices used during the migration to store a state of the virtual machine;
  - identify a second destination host machine for the virtual machine; and
  - cause the second destination host machine to obtain the stored state of the virtual machine from the one or more identified intermediary storage devices before the virtual machine is resumed at the second destination host machine.

8. The system of claim 7, wherein to cause the second destination host machine to obtain the state of the virtual machine, the processing device is to:
instruct the second destination host machine to retrieve the state of the virtual machine from the one or more identified intermediary storage devices.

9. The system of claim 7, wherein the state of the virtual machine on the one or more identified intermediary storage devices is at least a portion of memory of the virtual machine.

10. The system of claim 9, wherein to cause the second destination host machine to obtain the state of the virtual machine, the processing device is to:
send a request to the source host machine to migrate a remaining state of the virtual machine to the destination host machine.

11. The system of claim 7, wherein the plurality of intermediary storage devices and the source host machine are part of the same network.

12. The system of claim 7, wherein the plurality of intermediary storage devices and the destination host machine are part of the same network.

13. A non-transitory computer readable storage medium comprising instructions that, when executed by a processing device, cause the processing device to:
- receive a state of a virtual machine from a source host machine;
- store the state of the virtual machine before the virtual machine is suspended on the source host machine;
- transmit, by the processing device, the stored state of the virtual machine to a destination host machine before the virtual machine is resumed at the destination host machine;
- receive an indication that migration of the virtual machine from the source host machine to the destination host machine has failed after the virtual machine is suspended; and
- in response to the indication that the migration failed, provide, by the processing device, the stored state of the virtual machine to another destination host machine before the virtual machine is resumed at the other destination host machine.

14. The non-transitory computer readable storage medium of claim 13, wherein the state of the virtual machine is at least a portion of memory of the virtual machine of the source host machine.

15. The non-transitory computer readable storage medium of claim 13, wherein the processing device is part of an intermediary device, the intermediary device being communicably coupled to the source host machine and to the destination host machine.

16. The non-transitory computer readable storage medium of claim 15, wherein the destination host machine and the intermediary device are part of the same network.

17. The non-transitory computer readable storage medium of claim 13, wherein the state of a virtual machine comprises at least one of: memory of the virtual machine, a CPU register, or a register of devices accessible to the virtual machine.

* * * * *